US012752370B2

(12) United States Patent
Yamamoto et al.

(10) Patent No.: US 12,752,370 B2
(45) Date of Patent: Oct. 6, 2026

(54) LASER WELDING APPARATUS AND LASER WELDING METHOD

(71) Applicant: NHK SPRING CO., LTD., Yokohama (JP)

(72) Inventors: Asato Yamamoto, Yokohama (JP); Tadashi Tokiwa, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 1167 days.

(21) Appl. No.: 17/735,187

(22) Filed: May 3, 2022

(65) Prior Publication Data

US 2022/0362880 A1 Nov. 17, 2022

(30) Foreign Application Priority Data

May 12, 2021 (JP) ................................ 2021-081093

(51) Int. Cl.

*B23K 26/06* (2014.01)
*B23K 26/0622* (2014.01)
*B23K 26/08* (2014.01)
*B23K 26/21* (2014.01)

(52) U.S. Cl.

CPC .......... *B23K 26/0622* (2015.10); *B23K 26/21* (2015.10)

(58) Field of Classification Search

CPC .......................... B23K 26/0622; H01S 3/1024
See application file for complete search history.

(56) References Cited

U.S. PATENT DOCUMENTS 4,456,812 A * 6/1984 Neiheisel ............. C21D 8/1294 148/903
5,132,980 A * 7/1992 Connors ............... H01S 3/1022 372/101
5,502,292 A * 3/1996 Pernicka ............. B23K 26/244 219/121.64

(Continued)

FOREIGN PATENT DOCUMENTS

CN 102801089 A 11/2012
JP H08293299 A 11/1996

(Continued)

OTHER PUBLICATIONS

Chinese Office Action (and an English language translation thereof) dated Mar. 29, 2025, issued in counterpart Chinese Application No. 202210521204.4.

(Continued)

*Primary Examiner* — Ibrahime A Abraham
*Assistant Examiner* — Lawrence H Samuels
(74) *Attorney, Agent, or Firm* — Holtz, Holtz & Volek PC

(57) ABSTRACT

A laser welding apparatus includes a laser medium, an excitation light source and a control unit. The control unit supplies drive power to the excitation light source to inject excitation energy to the laser medium. The control unit supplies preliminary excitation power, which is smaller than pulsed drive power, to the excitation light source over a preliminary supply time, which is longer than a pulse width of the drive power before welding the first weld to be welded. After the preliminary supply time elapses and then an interval, the pulsed drive power is supplied to the excitation light source to weld the first weld.

5 Claims, 6 Drawing Sheets

(56) References Cited

U.S. PATENT DOCUMENTS

| | | | | |
|---|---|---|---|---|
| 5,837,960 | A * | 11/1998 | Lewis | B23K 26/144 219/121.64 |
| 7,094,988 | B1 * | 8/2006 | Taylor | B23K 26/144 219/121.64 |
| 10,855,050 | B1 * | 12/2020 | Boyd | H01S 3/083 |
| 2004/0101002 | A1 * | 5/2004 | Ukita | B23K 26/032 372/32 |
| 2005/0218122 | A1 * | 10/2005 | Yamamoto | B23K 26/0622 219/121.61 |
| 2007/0147441 | A1 * | 6/2007 | Tominaga | H01S 3/1024 372/6 |
| 2007/0223544 | A1 * | 9/2007 | Yamazaki | B23K 26/705 372/38.07 |
| 2008/0164301 | A1 * | 7/2008 | Nowak | B23K 26/144 228/226 |
| 2008/0253410 | A1 * | 10/2008 | Sakurai | B23K 26/0622 219/121.64 |
| 2010/0025387 | A1 * | 2/2010 | Arai | B23K 26/0624 219/121.73 |
| 2010/0032413 | A1 * | 2/2010 | Brenner | B23K 20/1275 219/76.1 |
| 2010/0177797 | A1 * | 7/2010 | Appleyard | B23K 26/082 372/38.03 |
| 2011/0019705 | A1 * | 1/2011 | Adams | H01S 3/13013 359/341.1 |
| 2012/0163402 | A1 * | 6/2012 | Oba | H01S 3/06754 372/6 |
| 2012/0300288 | A1 * | 11/2012 | Ogaki | H01S 3/1306 359/337.11 |
| 2012/0300289 | A1 * | 11/2012 | Ogaki | H01S 3/06754 359/341.1 |
| 2013/0043392 | A1 * | 2/2013 | Mildren | H01S 3/30 250/341.1 |
| 2015/0314392 | A1 * | 11/2015 | Haschke | B23K 26/04 219/121.64 |
| 2016/0149372 | A1 * | 5/2016 | Marincek | B23K 26/0626 606/2 |
| 2016/0172819 | A1 * | 6/2016 | Ogaki | H01S 3/1001 372/6 |
| 2017/0291258 | A1 * | 10/2017 | Izumi | B23K 26/705 |
| 2018/0178321 | A1 * | 6/2018 | Nakashima | B23K 15/0046 |

FOREIGN PATENT DOCUMENTS

| | | | |
|---|---|---|---|
| JP | H11333575 | A | 12/1999 |
| JP | 2004209543 | A | 7/2004 |
| JP | 2005095934 | A | 4/2005 |
| JP | 2009255150 | A | 11/2009 |
| JP | 2012253098 | A | 12/2012 |
| JP | 2015196168 | A | 11/2015 |

OTHER PUBLICATIONS

Chinese Office Action (and an English language translation thereof) dated Aug. 1, 2025, issued in corresponding Chinese Application No. 202210521204.4.

Japanese Office Action (and an English language translation thereof) dated Oct. 14, 2025, issued in corresponding Japanese Application No. 2024-159170.

* cited by examiner

LASER WELDING APPARATUS AND LASER WELDING METHOD

CROSS-REFERENCE TO RELATED APPLICATIONS

This application is based upon and claims the benefit of priority from prior Japanese Patent Application No. 2021-081093, filed May 12, 2021, the entire contents of which are incorporated herein by reference.

BACKGROUND OF THE INVENTION

1. Field of the Invention

The present invention relates to a laser welding apparatus for welding a plurality of welds of a workpiece and such a laser welding method.

2. Description of the Related Art

In order to weld a workpiece made from a plurality of small metal plates such as a suspension for a disk device, laser welding is used in some cases. Examples of the laser welding are discussed in JP 2005-9934 A (Patent Literature 1) and JP H08-293299 A (Patent Literature 2).

A suspension for a disc device includes a base plate, a load beam and a flexure. The load beam is made from a thin stainless steel plate. The flexure is disposed along the load beam. In order to fix the flexure to the load beam, spot welding using a laser beam, which will be referred to as laser welding, hereafter) is applied. The laser welding may as well be applied to fix the load beam to the base plate.

In order to form a plurality of welds on one workpiece, the so-called high-speed pulse welding is applied to reduce welding time. In high-speed pulse welding, for example, more than one hundred welds are welded per second. But, in high-speed pulsed welding, the output of laser beam on the first weld to be welded out of the multiple welds may be unstable. For this reason, depending on the quality in welding, the high-speed pulsed welding sometimes entails a drawback.

In order to prevent weld errors in the first weld, the so-called pre-shot of laser beam is carried out in some cases. One example of the pre-shot is to irradiate, just before welding the first weld, the laser beam to locations other than the workpiece. In another example of the pre-shot, the laser beam is irradiated onto a blank portion of the workpiece, which is irrelevant to the welds.

In the case of a minute workpiece such as a suspension for a disk device, it may not be possible to secure a space for carrying out the pre-shot in a part of the workpiece. There is another problem that the laser beam cannot be focused to a predetermined position if pre-shot is carried out while the workpiece is being moved toward the welding stage. For this reason, it is desirable to perform the pre-shot while the workpiece is stopped at the welding stage. However, in this case, extra time is spent before the first weld is welded, resulting in a decrease in productivity.

According to the present invention, a laser welding apparatus and a laser welding method, which can avoid welding errors in the first weld without performing pre-shot of laser beam when a number of welds are formed on a single workpiece.

BRIEF SUMMARY OF THE INVENTION

According to one embodiment, there is provided a laser welding apparatus for sequentially welding a plurality of welds of a workpiece by laser beams output in a pulse form. The welding apparatus comprises a laser medium, an excitation light source and a control unit. The laser medium emits the laser beam for the welds while excitation energy is injected thereto. The excitation light source injects the excitation energy to the laser medium while drive power is supplied thereto. The control unit supplies the drive power of a pulse form for the excitation energy to the excitation light source.

The control unit, before welding the first weld to be welded, of the plurality of welds, supplies power for preliminary excitation (to be referred to as preliminary excitation power), which is lower than the drive power, to the excitation light source over a preliminary supply time that is longer than a pulse width of the drive power. Thus, energy less than the excitation energy (to be referred to as preliminary excitation power) is injected to the laser medium before welding the first weld. Further, the control unit allows a predetermined interval to elapse before welding the first weld after the preliminary supply time elapses.

According to the laser welding apparatus of this embodiment, it is possible to avoid a welding error from occurring in the first weld without carrying out pre-shot of laser beam when forming a plurality of welds of a workpiece.

The laser welding apparatus according to the embodiment may comprise a scanning mechanism including a galvano scanner which scans the plurality of welds. The laser beams in the pulse form emitted by the laser medium is irradiated onto the plurality of welds in sequence via the galvano scanner.

The laser welding apparatus according to this embodiment, may further comprise a workpiece support portion on which a plurality of workpieces each identical to the workpiece are placed and a roving mechanism. The moving mechanism moves the workpieces placed on the workpiece support portion toward a welding stage and stops a workpiece to be welded at the welding stage. The control unit supplies the preliminary excitation power to the excitation light source while the workpiece to be welded is being moved toward the welding stage.

According to another embodiment, there is provided a laser welding method comprising supplying, before welding the first weld to be welded, preliminary excitation power, which is lower than the drive power and creates excitation energy, to an excitation light source over a preliminary supply time that is longer than a pulse width of the drive power. Thus, energy less than the excitation energy is injected to the laser medium. A predetermined interval is allowed to elapse before welding the first weld after the preliminary supply time elapses. The drive power is supplied to the excitation light source after the interval elapses, thereby injecting the excitation energy to the laser medium. The laser beam for the first weld is emitted from the laser medium by the excitation energy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Laser welding apparatus and laser welding method according to one embodiment will now be described with reference to FIGS. 1 to 9.

Figure 1:
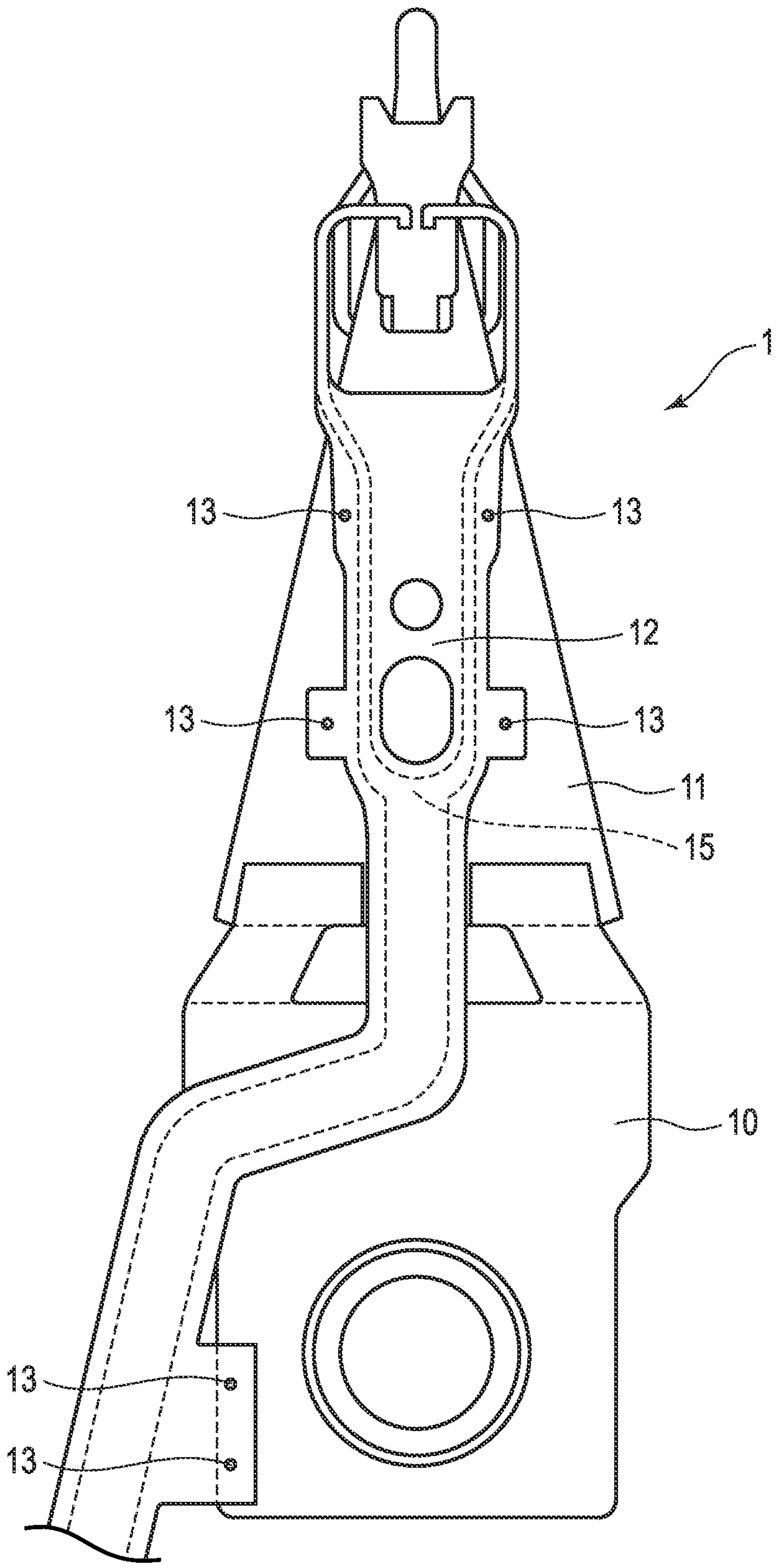
FIG. 1 is a plan view of a workpiece including a plurality of welds.

FIG. 1 shows a suspension for a disk device an example of a workpiece 1 including a plurality of welds. The workpiece 1 includes a base plate 10 made of stainless steel, a first plate (load beam) 11 and a second plate (flexure) 12.

The first plate 11 and the second plate 12 are each formed of stainless steel having springiness. The first plate 11 and the second plate 12 are fixed to each other by a plurality of welds 13. The welds 13 are formed with the laser welding apparatus 20 and by the laser welding method described below.

The first plate 11 is made of stainless steel to have a thickness of 200 μm or less. The thickness of the first plate 11 is greater than the thickness of the second plate 12. The second plate 12 is made of stainless steel to have a thickness of 100 μm or less. The thickness of the first plate 11 is, for example, 30 μm. The thickness of the second plate 12 is, for example, 18 μm. Along one surface of the second plate 12, a wiring portion 15 is formed. The wiring portion 15 incudes an insulating layer made of an insulating resin such as polyimide and a conductor made of copper.

The second plate 12 is made of a metal common to that of the first plate 11 (for example, austenitic, stainless steel such as SUS304). The chemical composition of SUS304 is 0.08 or less of C, 1.00 or less of Si, 2.00 or less of Mn, 8.00 to 10.50 of Ni, 18.00 to 20.00 of Cr and the remainder of Fe.

Figure 2:
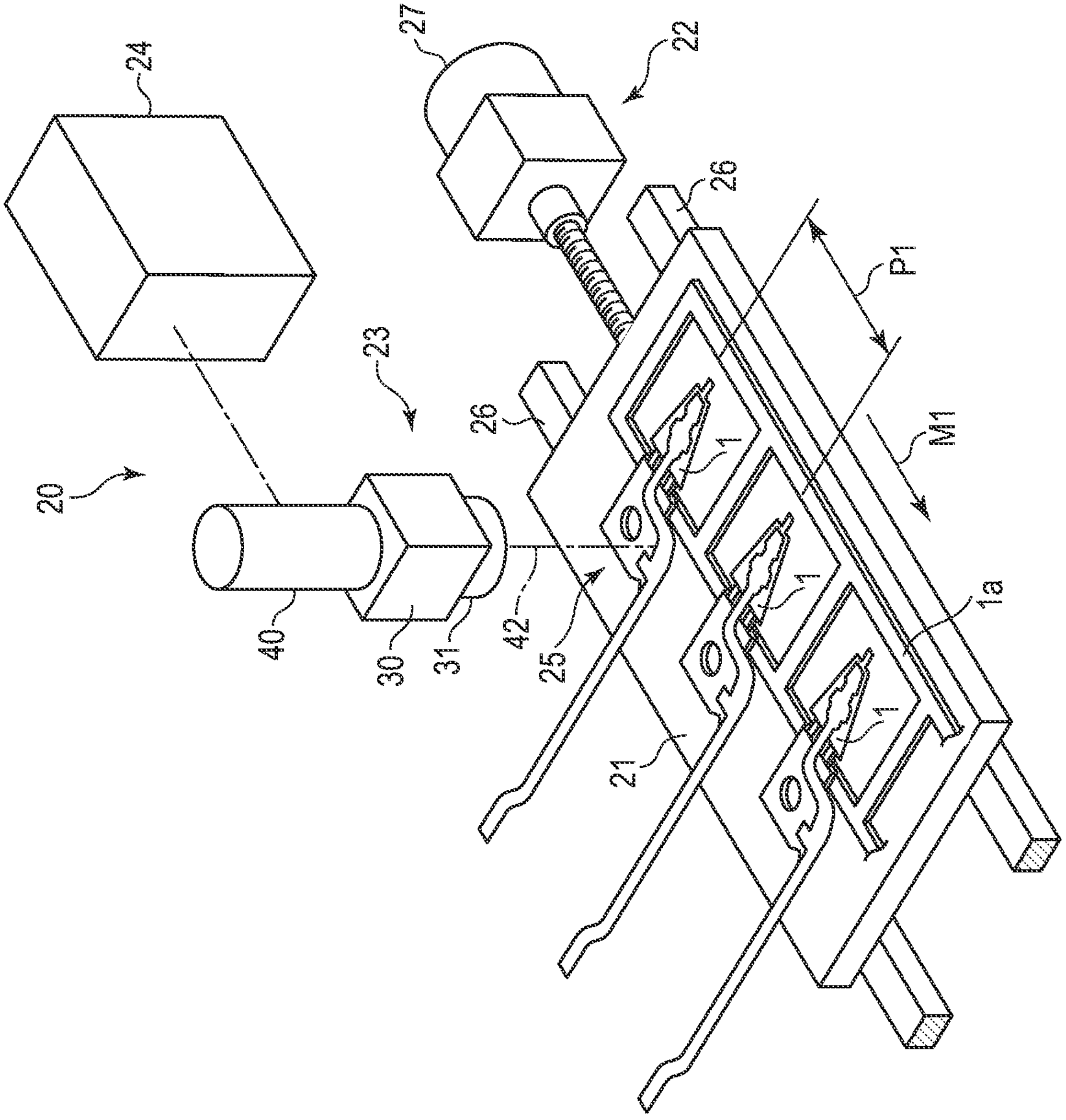
FIG. 2 is a perspective view schematically showing a laser welding apparatus according to one embodiment.

FIG. 2 schematically shows the laser welding apparatus 20. The laser welding apparatus 20 has the function of welding a plurality of welds 123 of the workpiece 1 sequentially by a laser beam emitted in pulsed form. The laser welding apparatus 20 shown in FIG. 2 includes a workpiece supporting portion 21, a moving mechanism 22, a laser irradiation device 23 and a control unit 24. The workpiece supporting portion 21 can support a plurality of workpieces 1. The moving mechanism 22 moves the workpiece supporting portion 21. The control unit 24 includes an electrical configuration for controlling the moving mechanism 22 and the laser irradiation device 23, software for control, a memory for storing data for control, and the like.

Figure 3:
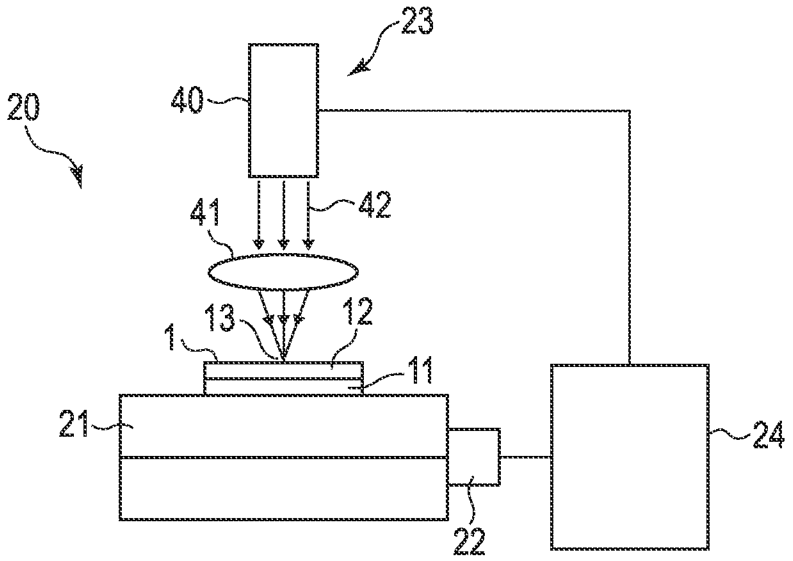
FIG. 3 is a front view partially showing the laser welding apparatus shown in FIG. 2.

As shown in FIG. 3, the first plate 11 and the second plate 12 of the workpiece 1 are stacked along the thickness direction. In this state, the workpiece 1 is secured to the workpiece supporting portion 21 with a retaining jig. The workpiece supporting portion 21 has the function of holding the workpiece 1 on a predetermined welding stage 25. The welding stage 25 is provided at a position corresponding to the laser irradiation device 23. The workpiece supporting portion 21 is made of, for example, ceramic. When the workpiece support portion 21 is made of ceramic, it is possible to avoid the molten metal generated in the welding portion 13 from sticking to the workpiece support portion 21.

As shown in FIG. 2, a plurality of workpieces are connected to each other along the moving direction (indicated by an arrow M1) of the workpieces 1 by a frame member 1*a* at a predetermined pitch P1. The moving mechanism 22 includes a guide member 26 and an actuator 27. The guide member 26 extends along the moving direction of the workpieces 1. The actuator 27 is, for example, a servo motor electrically controlled by the control unit 24. The actuator 27 moves the workpiece supporting portion 21 in a direction along the guide member 26 via a force transmission mechanism such as a ball screw.

The moving mechanism 22 moves the workpieces 1 placed on the workpiece supporting portion 21 towards the welding stage 25. The moving mechanism 22 moves the workpieces 1 in the direction indicated by an arrow M1 in FIG. 2, at a pitch P1 intermittently, one at a time. The moving mechanism 22 can stop a workpiece 1 to be welded, which is placed on the workpiece supporting portion 21, at the welding stage 25.

As shown in FIG. 2, the laser irradiation device 23 includes a laser head 31 comprising a galvano scanner 30. The galvano scanner 30 functions as a scanning mechanism for scanning the laser beam. The galvano scanner 30 moves the focal position of the laser beam emitted from the laser irradiation device 23 to the weld 13 to be welded on the workpiece 1 while it is stopped. By the scanning operation of the galvano scanner 30, the focal position of the laser optical system of the laser irradiation device 23 can be moved at high speed towards the weld 13.

FIG. 3 is a schematic diagram partially showing the workpiece 1 and the laser welding apparatus 20. The laser irradiation device 23 shown in FIG. 3 includes a laser oscillator 40, which is a generating source of the laser beam, and an optical lens system 41. The lens system 41 has the function of concentrating a laser beam 42 output by the laser oscillator 40 and irradiating the beam onto the weld 13 of the workpiece 1 in a state where the energy density is raised. The laser welding apparatus 20 is, for example, a solid-state laser that uses an yttrium-aluminum-garnet (YAG) rod. Here, note that a gas laser such as a $CO_2$ laser may be used, or a semiconductor laser or a fiber laser may as well be used, if necessary.

Figure 4:
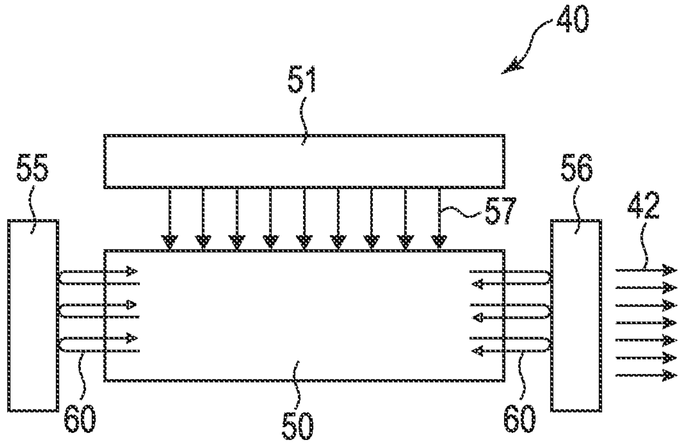
FIG. 4 is a plan view schematically showing a laser oscillator of the laser welding apparatus.

FIG. 4 schematically illustrates the laser oscillator 40. The laser oscillator 40, which functions as an optical resonator, includes a laser medium 50, an excitation light source 51, a high-reflectivity mirror 55 and a low-reflectivity mirror 56. The excitation light source 51 injects excitation energy into a laser medium 50 according to the drive power supplied. The high reflectivity mirror 55 and the low reflectivity mirror 56 are disposed to oppose each other. The control unit 24 supplies the drive power for injecting the excitation energy to the excitation light source 51.

When the power for oscillating the laser beam is supplied to the excitation light source 51, the excitation energy 57 radiated by the excitation light source 51 is injected to the laser medium 50. When the excitation energy 57 is injected into the laser medium 50, light 60 emitted from the laser medium 50 resonates between the high-reflectivity mirror 55 and the low-reflectivity mirror 56 so as to be amplified.

When the energy of the light 60 thus amplified exceeds the loss energy of the laser medium 50, laser oscillation occurs, emitting a laser beam 42 from the low-reflectivity mirror 56. The energy to be injected to the laser medium 50 can be varied according to the power supplied to the excitation light source 51. The wavelength of the laser oscillator 40 is, for example, 1.06 μm.

Figure 5:
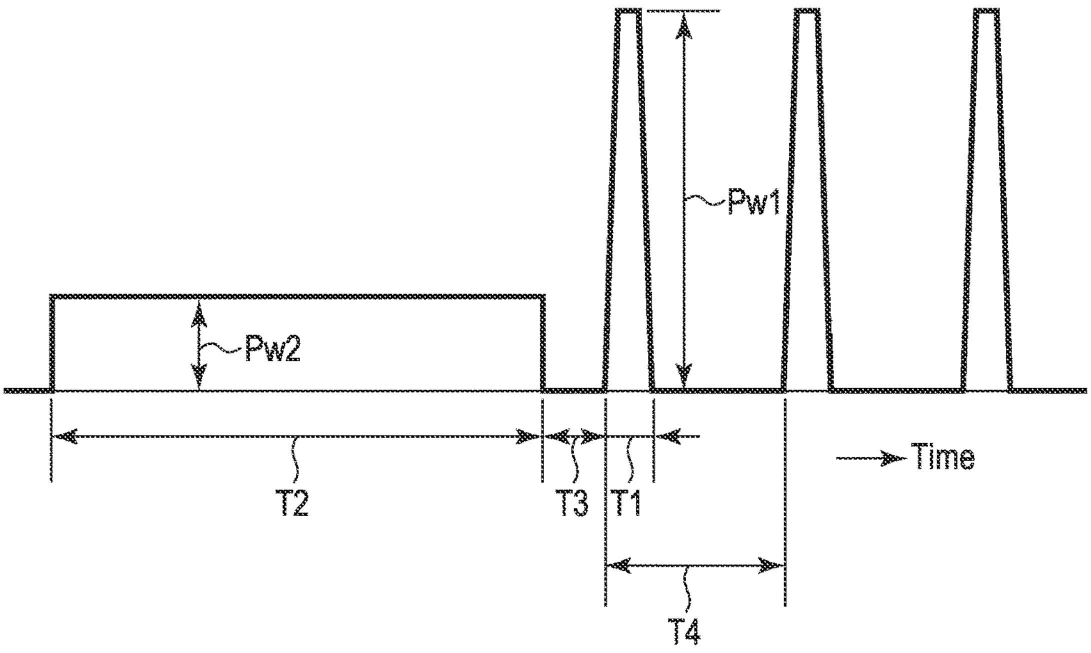
FIG. 5 is a time chart showing the relationship between power supplied to an excitation light source of the laser welding apparatus and time.

The laser welding method of this embodiment will now be described with reference to a time chart shown in FIG. 5 and a flowcharts shown in FIGS. 6 and 7. In this specification, one irradiation of laser beam for welding may be referred to as one shot in some cases.

Figure 6:
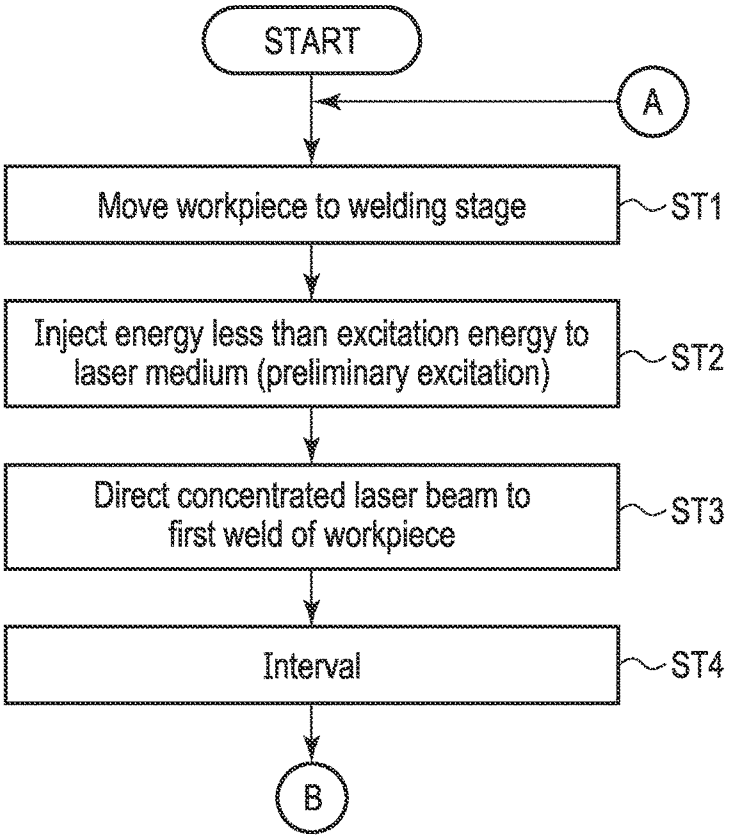
FIG. 6 is a flowchart showing a first half of a laser welding method according to one embodiment.

In step ST1 in FIG. 6, the workpiece 1 to be welded is moved by the moving mechanism 22 towards the welding stage 25 and the workpiece 1 is stopped at the welding stage 25. While the workpiece 1 is being moved in step ST1, or while the workpiece 1 is stopped at the welding stage 25, the operation of step ST2 is carried out. In step ST2, the energy for preliminary excitation is injected to the laser medium 50.

In step ST2, just before welding the first weld 13 to be welded, energy for preliminary excitation is injected. In this specification, the power that makes the laser medium 50 to produce the excitation energy is referred to as drive power Pw1 (as shown in FIG. 5). The power less than the drive power Pw1 is referred to as preliminary excitation power Pw2. In step ST2, the preliminary excitation power Pw2 is supplied to the excitation light source 51 for a preliminary supply time T2, which is longer than a pulse width T1 of the drive power Pw1. By step ST2, energy less than the excitation energy (referred to as preliminary excitation energy) is injected to the laser medium 50.

Step ST2 may be carried out while the workpiece 1 is being moved towards the welding stage 25 in step ST1. In this case, step T2 functions as a means of supplying the preliminary excitation power Pw2 to the excitation light source 51 while the workpiece 1 is being moved towards the welding stage 25. Thus, in step ST2, the preliminary excitation power Pw2 is supplied to the excitation light source 51 for a preliminary supply time T2, which is longer than the pulse width T1 prior to welding the first weld to be welded.

In step ST3 shown in FIG. 6, the scanning operation of the galvano scanner 30 is controlled. By the scanning operation, the destination of concentration of the laser beam emitted from the laser irradiation device 23 is directed to the first (first shot) weld of the workpiece 1.

After the preliminary supply time T2 has elapsed in step ST2, and just before welding the first weld, the control unit 24 allows to elapse a predetermined interval T3 in step ST4. The interval T3 is the same as the pulse width T1 of the drive power Pw1 or longer than the pulse width T1. Further, the interval T3 is shorter than the preliminary supply time T2 and shorter than a pulse interval T4 of the drive power Pw1. Step ST4 functions as a means of allowing the predetermined interval T3 to elapse before welding the first weld.

Figure 7:
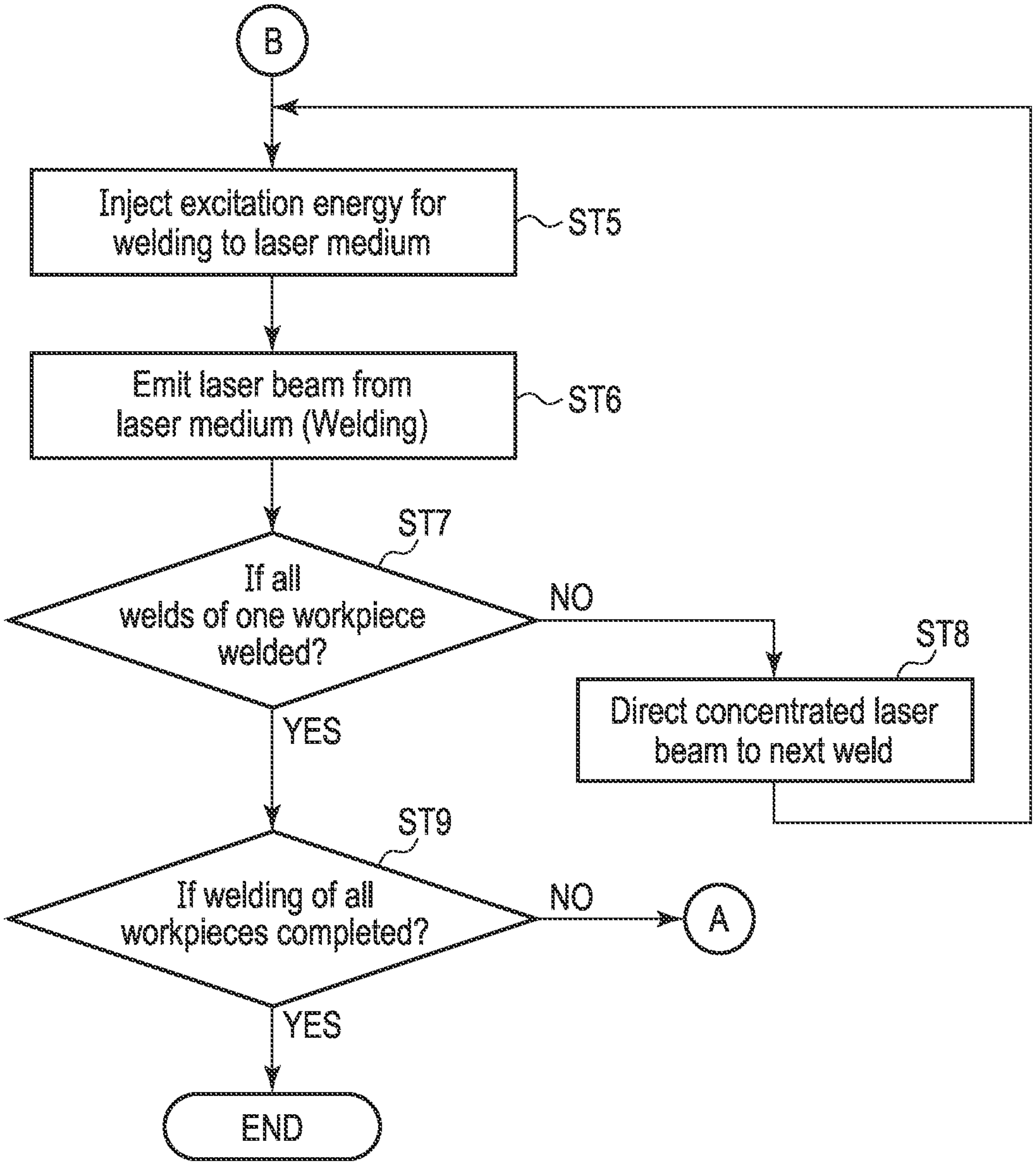
FIG. 7 is a flowchart showing a second half of the laser welding method of the embodiment.

After the interval T3 has elapsed, in step ST5 shown in FIG. 7, the pulse-form drive power Pw1 is supplied to the excitation light source 51. Thus, the excitation energy is injected to the laser medium 50. Due to the excitation energy injected to the laser medium 50, the laser beam for the first weld is emitted from the laser medium 50 in step ST6. Step ST5 functions as a means of supplying the drive power Pw1 to the excitation light source 51 while the workpiece 1 being stopped on the welding stage 25.

In step ST7, it is determined whether welding of all welds of one workpiece has been completed. If welding of all welds has not been completed ("NO" in step ST7), then the process proceeds to step ST8 to prepare for the second weld and subsequent ones.

In step ST8, the scanning operation of the galvanometer scanner 30 is controlled so as to direct the laser beam to be output from laser irradiation device 23 towards the second and subsequent welds. After that, by steps ST5 and ST6, the second and subsequent welds are formed.

In step ST7, if it is determined that all the welds of one workpiece have been welded ("YES" in step ST7), the process proceeds to step ST9. In step ST9, it is determined whether welding of all workpieces has been completed.

If it is determined in step ST9 that welding of all workpieces has not been completed ("NO" in step ST9)), the process returns to step ST1 in FIG. 6. By step ST1, the next workpiece (the second or subsequent workpiece) is moved to the welding stage 25. Then, a series of processing steps from step ST2 to step ST9 are repeated again, and thus the welding of the second and subsequent workpieces is carried out. If the arrangement pitch of multiple workpieces is small, the welding steps of step ST5 and step ST6 may be repeated onto the welds of the next workpiece without returning to step ST1.

In the above-described embodiment, a drive power Pw1 of a common magnitude is supplied to the excitation light source 51 for each of the welds. But, one workpiece from another, the thickness and material of the welds may differ. In such cases, the output (energy value) of the laser beam may be adjusted by changing the magnitude of the drive power Pw1 according to the thickness and material of the workpiece.

Figure 8:
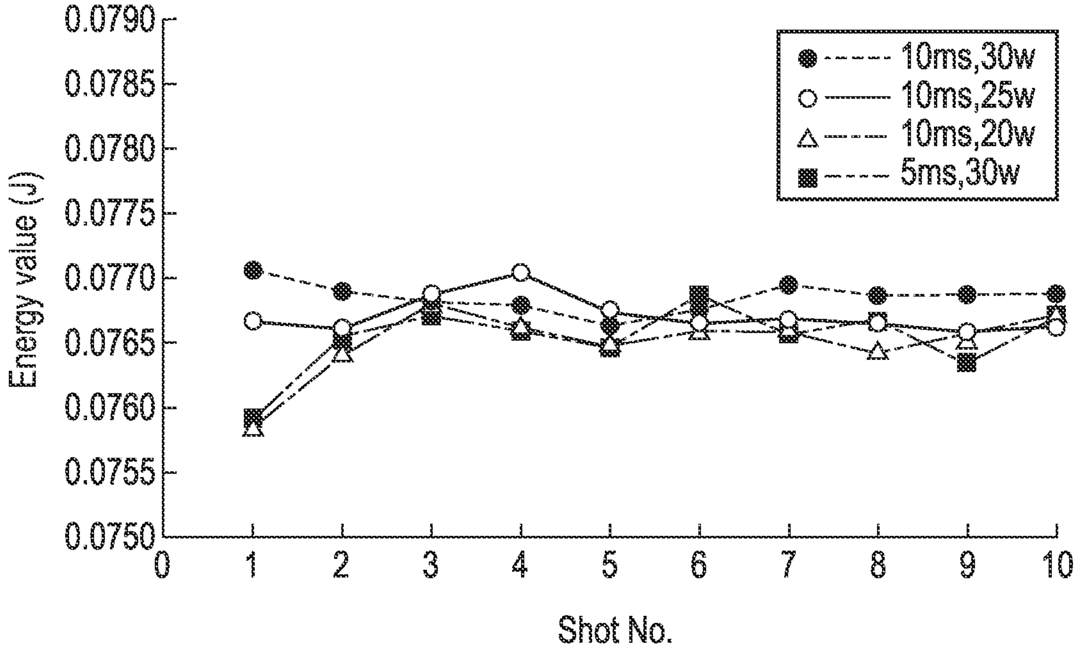
FIG. 8 is a diagram showing the relationship between the shot number counting from the first shot and the energy value in first to fourth examples in which the preliminary excitation conditions differ from each other.

The inventors of the present invention conducted experiments on four examples in which the preliminary excitation power Pw2 and the preliminary supply time T2 were changed. FIG. 8 shows the relationship between each shot number and the respective energy value for these examples (first to fourth examples). In FIG. 8, numeral "1" on the horizontal axis indicates the first shot (first weld). In each example, the number of shots (number of welds) per second is 200, and the excitation energy (drive power) for each shot is 100 W.

The black circle in FIG. 8 indicates the first example, in which the preliminary excitation power Pw2 is 30 W and the preliminary supply time T2 is 10 ms. The energy value of the first shot in the first example was 0.0772 J. Here, as compared to the energy values from the second shot on, there was no decrease observed in energy. Thus, weld errors in the first weld were avoided from occurring. In the first example, a slight emission of laser light was observed when the preliminary excitation power Pw2 was applied, but the energy was not sufficient to melt the workpiece.

The white circle in FIG. 8 indicates the second example, in which the preliminary excitation power Pw2 was 25 W and the preliminary supply time T2 is 10 ms. The energy value of the first shot in the second example was 0.0767 J. Here, as compared to the energy values from the second and subsequent shots, there was no substantial decrease observed in energy. Thus, weld errors in the first weld were avoided from occurring. In the second example, no emission of laser light was observed when the preliminary excitation power Pw2 was applied.

The white triangle in FIG. 8 indicates the third, example, in which the preliminary excitation power Pw2 was 20 W and the preliminary supply time T2 was 10 ms. The energy vale of the first shot in the third example was 0.0758 J. Here, as compared to the energy values from the second shot on, the energy drop in the first shot was significant. As a result, weld errors in the first weld were created.

The black square in FIG. 8 indicates the fourth example, in which the preliminary excitation power Pw2 was 30 W and the preliminary supply time T2 was 5 ms. The energy value of the first shot in the fourth example was 0.07459 J. Here, as compared to the energy values from the second shot on, the energy was significantly decreased. As a result, weld errors in the first weld were created.

Figure 9:
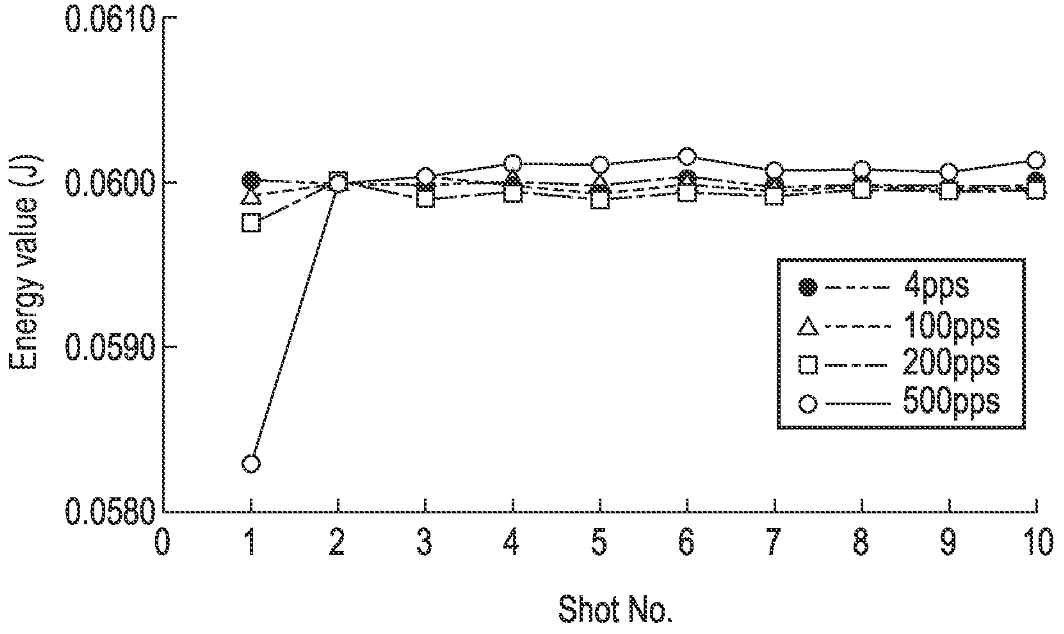
FIG. 9 is a diagram showing the relationship between the shot number counting from the first shot and the energy value in fifth to eighth examples in which the number of shots per unit time differ from each other.

The inventors of the present invention further conducted experiments on four examples in which the number of shots per unit time differs from one case to another when carrying out welding without applying the preliminary excitation energy. FIG. 9 shows the relationship between each shot number and the respective energy value for these examples (the fifth through eighth examples). In FIG. 9, numeral "1" on the horizontal axis indicates the first shot (first weld). Note, here that "PPS" is an abbreviation for pulse per second, which is the number of shots per second.

The black circle in FIG. 9 indicates the fifth example, in which the number of pulses per second was 42. The energy value of the first shot in the fifth example was 0.0600 J. Here, as compared to the energy values of from the second shot on, there was no decrease observed in energy. In such slow pulse welding, the quality of the first weld does not cause a problem. However, the welding time per workpiece is prolonged, resulting in lower production efficiency.

The white triangle in FIG. 9 indicates the sixth example, in which the number of pulses per second was 100. The energy value of the first shot in the sixth example was 0.0599 J. Here, as compared to the energy values of from the second shot on, there was decrease observed in energy. Therefore, in the sixth example, the quality of the first weld may be problematic.

The white square in FIG. 9 indicates the seventh example, in which the number of pulses per second was 200. The energy value of the first shot in the seventh example was 0.0598 J, and there was a decrease observed in energy, as compared to the energy values of from the second shot on. Therefore, in the seventh example, the quality of the first weld may be problematic.

The white circle in FIG. 9 indicates the eighth example, in which the number of pulses per second was 500. The energy value of the first shot in the eighth example was 0.0582 J. Here, the energy was significantly decreased as compared to the energy values of from the second shot on. Therefore, in the eighth example, the quality of the first weld deteriorated.

As described above, in the case of high-speed pulse welding with 100 or more shots per second, the decrease in the energy value of the first shot was problematic. The high-speed pulse welding has the advantage of high productivity because a large number of welds can be welded in a relatively short time, whereas the quality of the first weld becomes problematic.

From the above results, the following specific items have been found to be effective in preventing weld errors in the first weld without lowering the efficiency of the laser welding. That is, in high-speed pulse welding with 100 or more shots per second, a preliminary excitation power Pw2 of 25 W or higher is supplied to the excitation light source 51 in a preliminary supply time T2 of 10 ms or more.

When implementing the present invention, it is only natural that the specific configuration of the laser irradiation device, control unit, workpiece support unit, etc., can be changed in various ways. The invention can also be applied to welding of workpieces other than suspensions for disk devices.

Additional advantages and modifications will readily occur to those skilled in the art. Therefore, the invention its broader aspects is not limited to the specific details and representative embodiments shown and described herein. Accordingly, various modifications may be made without departing from the spirit or scope of the general inventive concept as defined by the appended claims and their equivalents.

What is claimed is:

1. A laser welding apparatus for sequentially welding a plurality of welds of a workpiece by laser beams output in a pulse form, the apparatus comprising:

a laser medium which emits the laser beam for the welds while excitation energy is injected thereto;

an excitation light source which injects the excitation energy to the laser medium while drive power is supplied thereto;

a control unit which supplies the drive power of a pulse form for the excitation energy to the excitation light source;

a workpiece support portion on which a plurality of workpieces each identical to the workpiece are placed; and a moving mechanism which moves the workpieces placed on the workpiece support portion toward a welding stage and stops a workpiece to be welded at the welding stage, wherein the control unit, before welding the first weld to be welded of the plurality of welds, executes processes comprising:

injecting energy less than the excitation energy to the laser medium by supplying a preliminary excitation power, which is lower than the drive power, to the excitation light source over a preliminary supply time that is longer than a pulse width of the drive power, the preliminary excitation power being supplied to the excitation light source while the workpieces placed on the workpiece support portion are being moved toward the welding stage, and allowing an interval which is shorter than the preliminary supply time to elapse before welding the first weld after the preliminary supply time elapses.

2. The laser welding apparatus of claim 1, further comprising:

a scanning mechanism including a galvano scanner which scans the plurality of welds and irradiates the laser beams in the pulse form emitted by the laser medium to the plurality of welds in sequence.

3. A laser welding method for sequentially welding a plurality of welds of a workpiece by laser beams output in a pulsed manner, the method comprising:

injecting, before welding the first weld to be welded of the plurality of welds, energy less than the excitation energy to a laser medium by supplying a preliminary excitation power, which is lower than a drive power and creates excitation energy, to an excitation light source over a preliminary supply time that is longer than a pulse width of the drive power, the preliminary excitation power being supplied to the excitation light source while the workpiece, placed on a workpiece support portion, is being moved toward the welding stage;

allowing an interval which is shorter than the preliminary supply time to elapse before welding the first weld after the preliminary supply time elapses;

injecting the excitation energy to the laser medium by supplying the drive power to the excitation light source after the interval elapses; and emitting the laser beam for the first weld from the laser medium by the excitation energy.

4. The laser welding method of claim 3, wherein the interval is greater than or equal to the pulse width of the drive power.

5. The laser welding method of claim 3, further comprising:

supplying the drive power of a same magnitude for each of the plurality of welds to the excitation light source and welding the plurality of welds by high-speed pulse welding with over 100 pulses per second.

* * * * *